(12) United States Patent
Peebles (10) Patent No.: US 6,231,004 B1
(45) Date of Patent: May 15, 2001

(54) FLUID DYNAMIC LIFT GENERATION

(76) Inventor: Patrick Peebles, La Mandriola, Via Laurentina Km 14.2, Rome RM 00143 (IT)

( * ) Notice: Subject to any disclaimer, the term of this patent is extended or adjusted under 35 U.S.C. 154(b) by 0 days.

(21) Appl. No.: 09/242,502

(22) PCT Filed: Aug. 18, 1997

(86) PCT No.: PCT/EP97/04492

§ 371 Date: Feb. 16, 1999

§ 102(e) Date: Feb. 16, 1999

(87) PCT Pub. No.: WO98/07622

PCT Pub. Date: Feb. 26, 1998

(30) Foreign Application Priority Data

Aug. 20, 1996 (GB) .................................................. 9617440

(51) Int. Cl.[7] ............................. B64C 27/22; B64C 39/00
(52) U.S. Cl. .................................................. 244/10; 244/9
(58) Field of Search ........................... 244/206, 9, 10, 244/19, 21, 153 A, 39; 416/23, 24, 120, 130

(56) References Cited

U.S. PATENT DOCUMENTS

| | | | |
|---|---|---|---|
| 932,884 | * 8/1909 | Muckle | 244/19 |
| 1,417,602 | * 5/1922 | Hedberg | 244/9 |
| 1,487,228 | * 3/1924 | Garcia | 244/9 |
| 1,533,713 | * 4/1925 | Tatay | 244/9 |
| 1,535,613 | * 4/1925 | McFarlane | 244/9 |
| 1,613,834 | * 1/1927 | Jordanoff | 244/10 |
| 1,635,364 | * 7/1927 | Haussmann | 244/9 |
| 1,714,608 | * 5/1929 | Massey | 244/10 |
| 1,714,609 | * 5/1929 | Massey | 244/10 |
| 1,759,468 | * 5/1930 | Smith | 244/9 |
| 1,773,432 | * 8/1930 | Mueller | 244/21 |
| 1,796,860 | * 3/1931 | Bowers | 244/9 |
| 1,820,919 | * 9/1931 | Massey | 244/10 |
| 1,849,547 | * 3/1932 | Marsan | 244/9 |
| 1,850,925 | * 3/1932 | Evans | 244/10 |
| 1,875,276 | * 8/1932 | Steigert | 244/10 |
| 1,879,594 | * 9/1932 | Trey | 244/10 |
| 1,927,538 | * 9/1933 | Zaparka | 244/10 |
| 1,991,378 | * 2/1935 | Christiansen | 244/19 |
| 2,039,676 | * 5/1936 | Zaparka | 244/21 |
| 2,050,903 | * 8/1936 | Topliff | 244/9 |
| 2,173,832 | * 9/1939 | Fahrney | 244/9 |
| 2,344,515 | * 3/1944 | Massey | 244/10 |
| 2,397,189 | * 3/1946 | Main | 244/9 |
| 3,065,928 | * 11/1962 | Dornier | 244/10 |
| 3,140,065 | * 7/1964 | Alvarez-Calderon | 244/10 |
| 3,448,714 | * 6/1969 | Brooks | 416/24 |
| 4,307,677 | * 12/1981 | Jastram et al. | 114/167 |
| 5,100,080 | * 3/1992 | Servanty | 244/9 |

FOREIGN PATENT DOCUMENTS

| | | | |
|---|---|---|---|
| 003837812A1 | * 5/1990 | (DE) | 244/206 |
| 885666 | * 12/1961 | (GB) . | |
| 2029909 | * 3/1980 | (GB) | 416/24 |
| 357186069A | * 11/1982 | (JP) | 416/24 |

* cited by examiner

*Primary Examiner*—Peter M. Poon
*Assistant Examiner*—Son T. Nguyen
(74) *Attorney, Agent, or Firm*—Flint & Kim, P.A.

(57) ABSTRACT

An aircraft lifting member (wing) comprises a crossflow rotor 2 formed of a core 4 having rotor vanes 5 mounted around it, disposed in a trough 3 at the front upper part of a wing-like body 1. Rotation of the rotor induces a downwardly and rearwardly directed airflow over the upper surface 6 of the wing-like body 1 generating both lift and thrust. The upper part of the rotor vane path projects above the upper surface 6 and the lift-generating member is open at the leading edge to expose the cross-flow rotor 2 to the incident airflow.

9 Claims, 8 Drawing Sheets

16blades155

| V | A | Rpm | W | Static | Sec/t | Lift | G/W | Stat/Lift |
|---|---|---|---|---|---|---|---|---|
| 2.2 | 4 | 1020 | 8.8 | 7 | 8.28 | 35 | 3.98 | 5.00 |
| 3 | 6 | 1680 | 18 | 25 | 4.18 | 135 | 7.50 | 5.40 |
| 3 | 6.5 | 1920 | 19.5 | 30 | 3.59 | 180 | 9.23 | 6.00 |
| 4 | 9.5 | 2580 | 38 | 60 | 2.84 | 350 | 9.21 | 5.83 |
| 4 | 9.5 | 2500 | 38 | 50 | 2.68 | 390 | 10.26 | 7.80 |
| 5 | 12 | 3240 | 60 | 95 | 2.25 | 550 | 9.17 | 5.79 |
| 5 | 12 | 3240 | 60 | 85 | 2.12 | 590 | 9.83 | 6.94 |
| 6 | 14.5 | 3660 | 87 | 125 | 2.22 | 830 | 9.54 | 6.64 |
| 6 | 15 | 3780 | 90 | 105 | 2 | 830 | 9.22 | 7.90 |
| 6.5 | 17 | 4140 | 110.5 | 110 | 1.97 | 1000 | 9.05 | 9.09 |
| 7 | 18 | 4200 | 126 | 170 | 2.03 | 1200 | 9.52 | 7.06 |
| | | | | | | Average | 8.77 | 6.68 |

FLUID DYNAMIC LIFT GENERATION

The present invention relates to an improved form of lifting member using a fluid flow, either of an aerodynamic nature or a hydrodynamic nature. It Is particularly useful for an aircraft, and in particular as a high lift wing which will provide both high lift and thrust for a low speed aircraft, making it attractive for STOL (short takeoff and landing) purposes.

In the past STOL aircraft have depended upon either lift augmentation of an aerofoll wing, for example by blown flaps and/or the use of slats and leading edge flaps, and/or upon the use of a tilt wing construction where an engine is mounted fixed in relation to the wing so that tilting the wing to a higher angle of incidence also tilts the engine to give a measure of vectored thrust. Vectored jet thrust in the context of vertical/short take-off and landing (V/STOL) flight is also known.

The present invention aims to provide a novel way of achieving high lift at low forward speed of an aircraft.

GB-A-885888 discloses the use of a cross flow rotor at various locations in an aerofoll body, and includes in FIGS. 27 and 26 a cross-low rotor embedded in the leading edge of the aerofoll body.

In accordance with the present invention there is provided a lift-generating member comprising a wing-like body defining leading and trailing edges and opposed surfaces which converge towards said trailing edge, and a spanwise extending cross-flow rotor positioned adjacent the leading edge and one of said opposed surfaces to define an air intake region and an air discharge region along the circumferential path of the rotor vanes; wherein the rotor rotates in a direction which carries the rotor vanes in the part of their path which is adjacent said one opposed surface in a direction which extends towards the trailing edge of the wing-like body; characterised In that the surface of the rotor projects proud of the said one opposed surface over at least said air discharge region; and in that the rotor is exposed to air at the leading edge of the wing-like body to define a leading edge of the lift-generating member and to take in air at the front of said body and to discharge it over said opposed surface as a result of rotation of the rotor.

By providing for a differential in efficiency between the rotors on either side of the center line of an aircraft it is possible to control the lift differentially, to give a means of banking the aircraft.

If desired, the rotors may provide not just the lift but also all of the thrust which is required for forward propulsion of the aircraft, in which case differential power to either side of the centre line of the aircraft also provides for a measure of yaw control and for a means of controlling the aircraft in a stable banked turn.

In order that the present invention may more readily be understood the following description is given, merely by way of example, with reference to the accompanying drawings, in which.

Figure 1:
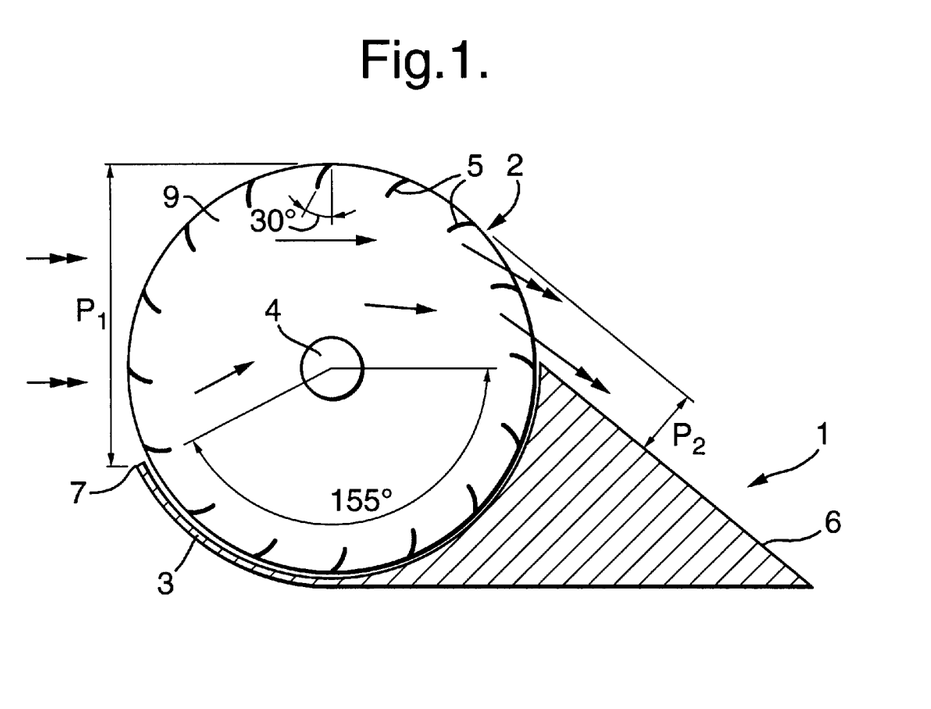
FIG. 1 is a cross-section through a first embodiment of lifting member in accordance with the present invention.

The lifting member shown in FIG. 1 uses the combination of a tapered wing-like body 1 and a spanwise extending cylindrical crossflow rotor 2 set into an upwardly open trough-like recess 3 in the front of the wing body 1 near the leading edge 7 of the wing body. As shown In FIG. 1, the crossflow rotor 2 projects upwardly into the airflow passing over the upper surface 6 of the body 1 and it is indeed the rotation of the rotor 2, in the clockwise direction as viewed in FIG. 1, that induces this airflow. The rotor is open to the incident airflow at the front of the lifting member.

FIG. 1 shows that the rotor 2 is a form of crossflow rotor, also known as a tangential flow rotor, extending spanwise along the wing body. In its crudest form the rotor has a succession of discs 9 with high aspect ratio fan vanes 5 extending between the successive discs along the rotor. An optional central shaft 4 connects the various discs together and is driven by the drive means, which preferably includes a differential gearbox mechanism to vary the power distribution between such a lifting member to one side of the aircraft, and a similar such lifting member the other side. Such a rotor will of course be able to be used with any alternative wing body shape such as any of those shown in FIGS. 1, 2 and 6 to 12.

The crossflow rotor 2 rotates clockwise as viewed in FIG. 1 and generates an airflow, shown by the double-headed arrows, deflected upwardly over the upper surface of the rotor core 4 at an air intake region of the rotor blade path and then passing obliquely downwardly from an air discharge region of the rotor blade path to follow the upper surface of the tapering wing body 1. At the trailing edge of the wing body 1 the airflow will detach in the form of a downwardly and rearwardly moving stream which generates a downward component of airflow giving rise to augmented lift of the lifting member, and also a rearward component which generates thrust to induce forward propulsion of the lifting member. Although not shown in FIG. 1, when forward propulsion of the lifting member is established there will be also be an airflow passing under the wing body 1 so that the incident airstream from the left hand side of the lifting member shown in FIG. 1 will divide, with some passing over the rotor and the rest passing under the wing body, and with these two flows recombining, preferably with minimum turbulence, at the trailing edge. This, combined with an aerofoll general shape to the cross-section of the lifting member (wing body 1 and crossflow rotor 2) may also generate aerodynamic lift in the conventional manner.

By increasing the speed of rotation of the rotor its output power can be increased and hence both the lift and the thrust on that lifting member can be increased.

As will be clear from a reading of the following description, there are various other possibilities for designing the spanwise crossflow rotor 2. However, the concept remains the same in that there will be an airflow induced over the wing body giving rise to both lift and thrust.

An aircraft incorporating the lifting member in accordance with the present Invention may have additional thrust-generating means such as at least one engine driven propeller or at least one turbine or rocket engine, but it is envisaged that all of the thrust may be derived from the crossflow rotor 2.

Hence variation of the speed of rotation of the rotor 2 (or its efficiency by means shown in FIGS. 7, 12a and 12b) will not change simply the lift on that lifting members; It may also vary the thrust of that same lifting member to an extent which will allow yaw control of the aircraft having such a lifting member as a wing.

Where this differential lift facility is available it is possible for the aircraft to omit the convention lateral guidance means (such as a rudder) and/or roll control means (for example ailerons).

Although it is possible for ailerons to be omitted in their entirety, it may be helpful to have ailerons present in order to compensate for the de-stabilizing effects of a side-wind on cross-wind lending. Where ailerons are provided, it is expected that they will still produce aileron-induced yaw.

An aircraft using the lifting member of the present invention may include a variable speed drive motor driving a means (such as a differential gearbox) of varying the division of power between the spanwise rotor of the lifting member on the starboard side and the spanwise rotor of the lifting member on the port side, for the purposes of controlling yaw and/or roll.

It is also conceivable for the speed control to be linked to a conventional pitch control means such as a control column normally driving an elevator, so that increasing the motor speed will increase the power to both port and starboard side of the aircraft and hence increase the lift, giving a nose-up tendency, and vice versa. This may either augment or replace the elevator. Alternatively conventional elevator control may be employed, and the speed of the motor diving the rotor 2 may instead be controlled separately In the manner of lift augmentation means such as leading edge and/or trailing edge flaps of a conventional aircraft.

Equally it is possible for there to be a control surface attached to the wing body 1, for example of the trailing edge, in order to vary the aerodynamic camber of that wing body for the purposes of further augmenting lift.

If desired the wing body member 1 of FIG. 1 may have the trailing edge occurring at the end of a sharper taper zone starting at a point on the upper surface of the tapering wing body. In this case the undersurface of the wing body may be a continuous planar surface as shown in FIG. 1. However alternatively the undersurface could equally include a point of discontinuity (similar to such a point of the upper surface) at which the angle of inclination of the lower surface either increases or decreases.

Also, the trailing edge may be at the end of a downwardly curved portion of the wing body to impart aerofoll camber to the wing today, resulting from the curvature of the part of the wing body behind the trough 3 and rotor 2. The upper surface may be convex overall (so that for the entire wing body can be of curved form with a generally aerofoll configuration) or may become convex after a point marking the termination of a forward generally planar upper surface. (It will of course be appreciated that the downwardly curved portion may be in the form of a succession of generally planar surfaces giving rise to a succession of stepped regions of different inclinations to resemble such a curved configuration).

In all of the embodiments the vanes may form a close non-interference fit with the concave part-cylindrical wall of the wing body defining the trough 3.

Figure 4:
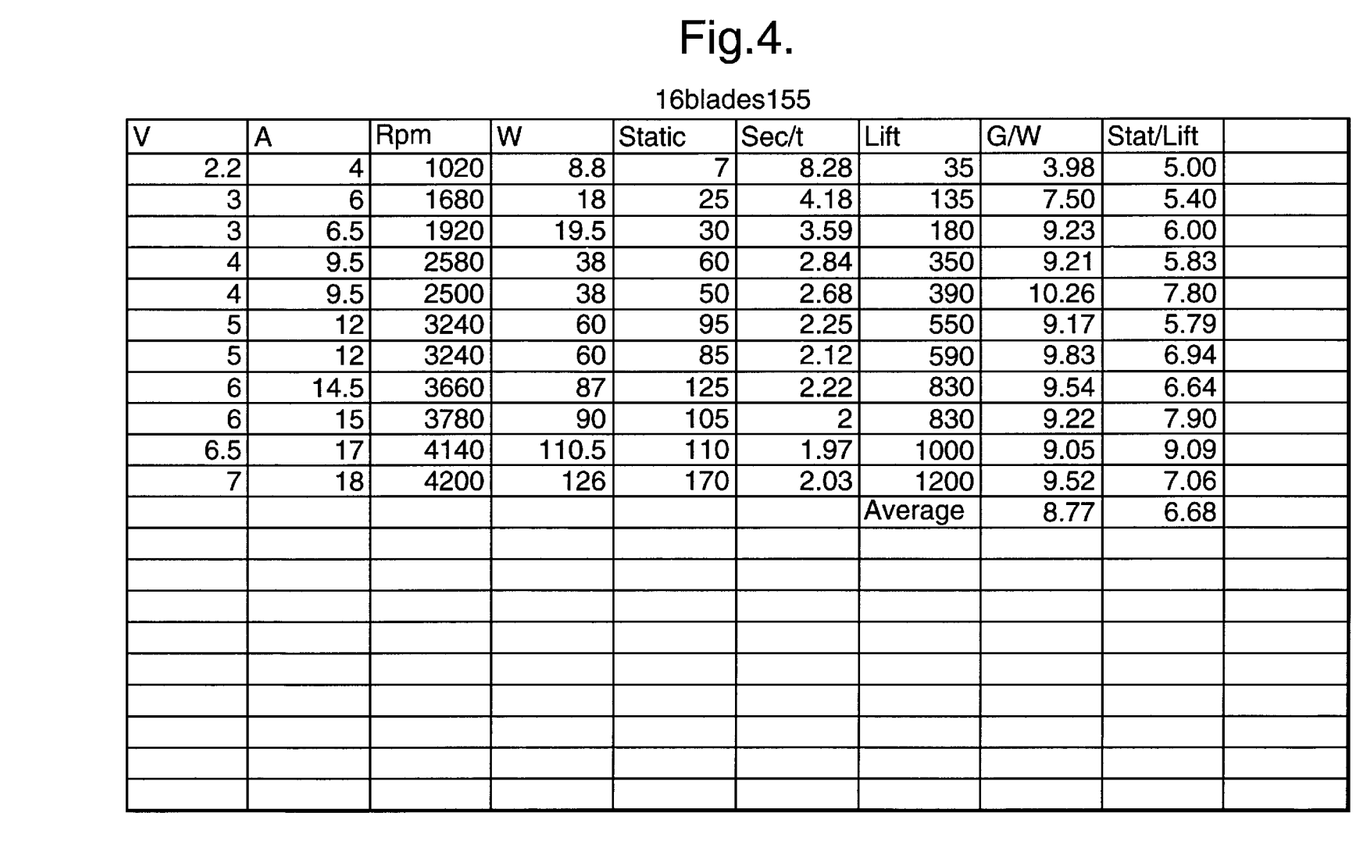
FIG. 4 is a table of operating parameters measured using a tethered wing of the design shown in FIG. 1.
Figure 5:
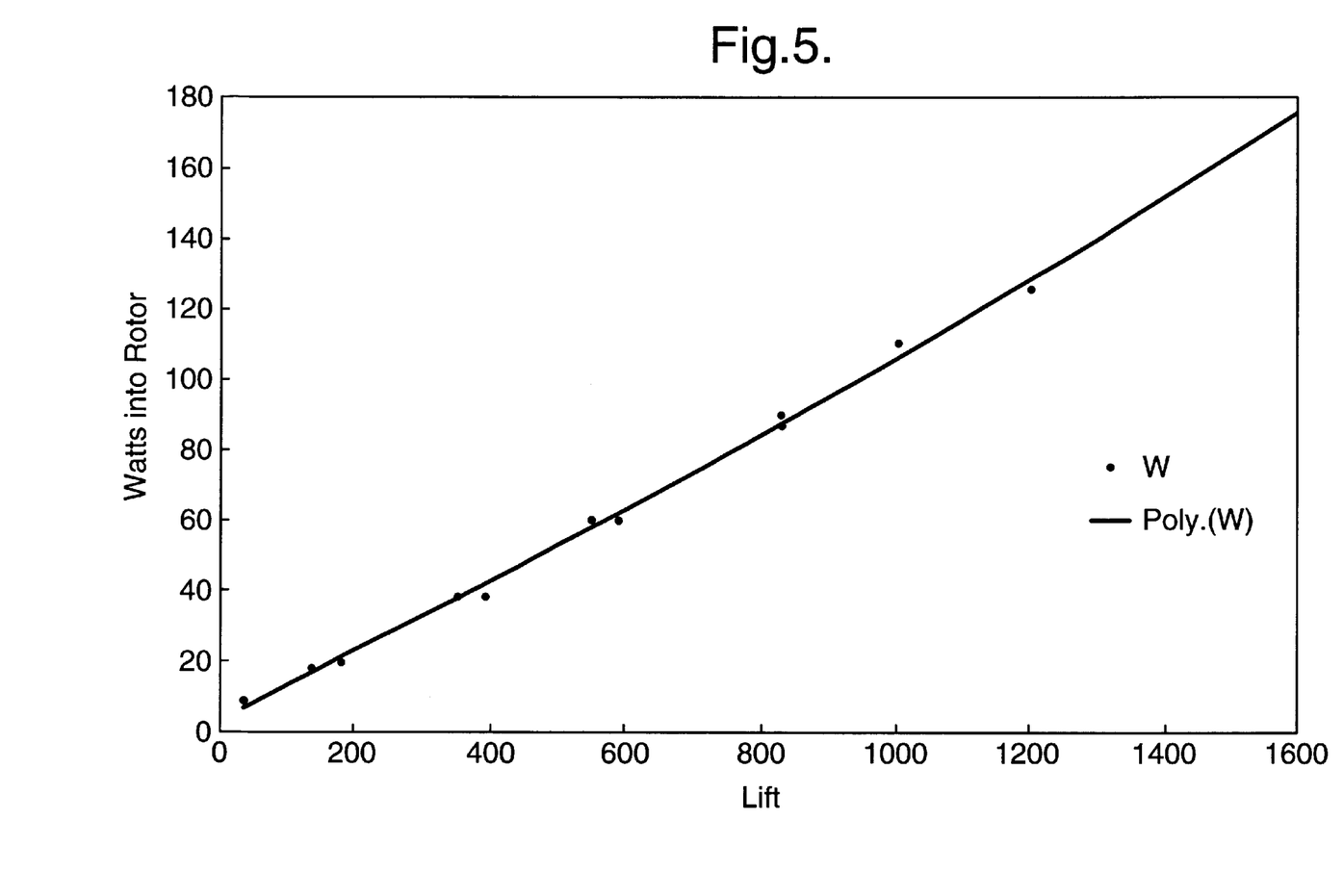
FIG. 5 is a graph of rotor input power plotted against lift in grams force.

In the preferred embodiment shown in FIG. 1, the rotor discs 9 have a diameter of 80 mm. Between two successive rotor discs 9 along the span of the lifting member are 16 rotor vanes 5, in this case each of 10 mm chord and 0.6 mm thickness. The blades are part-cylindrical curved sheets having a 30 mm radius of curvature. This is the design of prototype used for the tests whose results are shown in FIGS. 4 and 5.

In this case the trough 3 is part-cylindrical and has the discs 9 fitting closely within it. It extends over 155° of arc of the cylinder defining the trough. Thus, as viewed in FIG. 1, the left hand- or leading edge-side of the wing body member is cut away at 7 to expose the rotor to the incident airflow.

As shown in FIG. 1, the rotor vanes 5 are in this case set at an angle of 30° with respect to that radius which also passes through the edge of the rotor vane 5 lying farthest from the shaft 4. It may also be of value to control the angle of these blades while the rotor is turning. This could be in the form of collective pitch which would change the angle of all the blades at the same time or in the form of cyclic pitch control which would control the angle of the blades depending on their position relative to the wing body.

Figure 2:
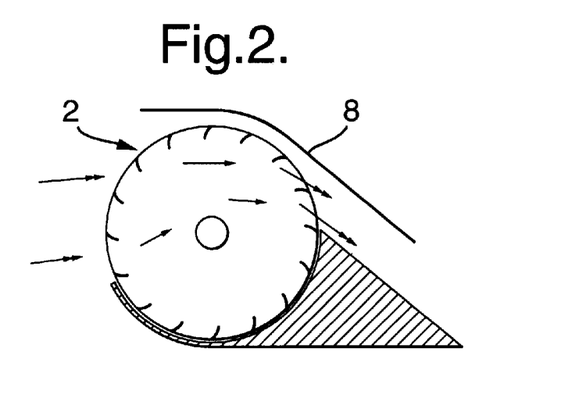
FIG. 2 is a view similar to FIG. 1 but on a reduced scale and showing a modified form of the wing body of the lifting member.

FIG. 2 shows a variant, generally similar to the embodiment of FIG. 1, but with a slat or cover 8 over the rotor to define a slot to control the airflow over the upper surface of the lifting member.

Figure 3:
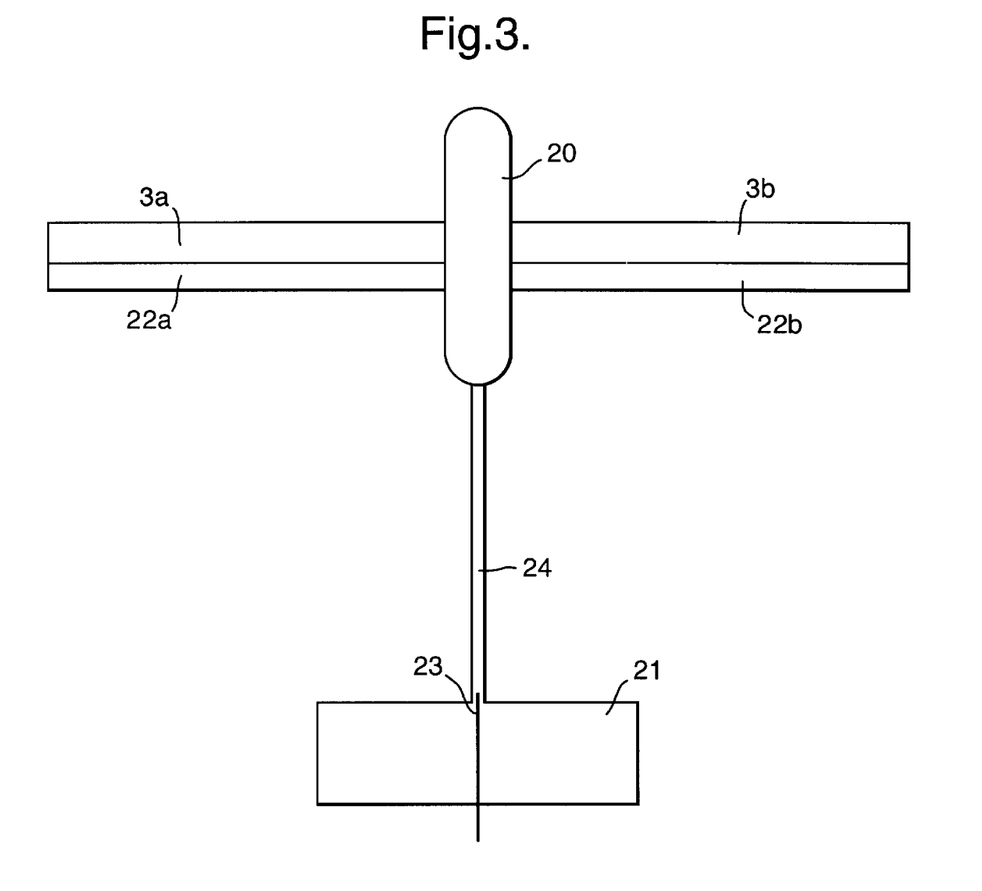
FIG. 3 is a top plan view of an aircraft incorporating the lifting member of FIG. 1.

A model incorporating the design shown in FIG. 1 has been run using direct drive to the rotors to each side of the fuselage centre line of the model. Such a model is shown in plan view in FIG. 3 as comprising a fuselage 20 having a fixed tail plane 21 and a port wing body 22a and a starboard wing body 22b. In this case a fin or vertical stabilizer 23 has also been mounted on a tail 24 of the model. The rotor has been omitted from FIG. 3 but the trough 3a and 3b of the respective wing member 22a and 22b is illustrated. It is thus possible to visualise the way in which the lifting body cross-section of FIG. 1 has been adapted to the model aircraft.

The model has an all up weight of 3.4 Kg which includes a 1 horse power motor of 5 cc displacement. The wing span of the model is 206 cm, and this comprises two active wing bodies 22a and 22b each of 93 cm span.

The model was flown in radio-controlled free flight. The airspeeds and power values (see FIGS. 4 and 5) were extrapolated using the test results of a 90 cm span tethered wing prototype of the wing body of FIG. 1.

For take-off the motor was running at one-third of its maximum power. Stable flight speed was measured as approximately 5.5 metres per second.

A similar tethered test was carried out using a single lifting member, of the type shown in FIG. 1 with its rotor 2 driven by an electric motor, mounted on a mast and counterbalanced by a mass arm. With such an apparatus the various parameters shown in FIG. 4 were determined. They are as follows:

V represents the voltage applied to the motor.

A represents the motor current in amps.

The third column shows the rotor speed in r.p.m..

W represents the rotor input power in watts.

The fifth column represents the forward (propulsive) thrust measured when the lifting member was held stationary, i.e. not allowed to orbit the mast.

The sixth column shows the average time to complete one revolution about the mast, when in the steady state.

The seventh column tabulates the lift force in grams.

The eighth column is the quotient of lift (gm) divided by rotor input power (watts) (i.e. the value in the seventh column divided by the value in the fourth column).

The ninth column illustrates the ratio of static thrust:lift (static thrust as shown in the fifth column, and lift as measured while the wing was in motion) for each value of the rotor speed and power quoted in the third and fourth columns.

FIG. 5 illustrates a plot of the input power of the rotor measured in watts, as the ordinate, and the lift in grams measured as the abscissa. The points correspond to the measured values tabulated in FIG. 4, and the straight line illustrates the theoretical (compromise) plot and can be seen to be a nearly straight line.

In other words, the efficiency of the lifting member shown in FIG. 1 appears to be constant over the range of rotor speeds tested, and over the orbiting speeds encountered.

There are of course various alternative possibilities for the geometry of the rotor used with the device of FIG. 1. For example, the thickness and chord values of the rotor vanes 5 may be varied. The angle of incidence (30° in FIG. 1) of the rotor vanes may be changed. Also, the angle of are subtended by the trough 3 may be varied.

With the device shown in FIG. 1 it has been discovered that, for a given rotor speed, the lift tends to increase as the speed increases. Bearing in mind that the vertical projection $P_1$ of the part of the rotor on which the incident air impinges is much greater than the projection $P_2$ on to a line normal to the upper surface 6 of the wing body, it is possible that there is some form of compressibility effect generated through the ram effect of the incident air arriving at the rotor area exposed at the front of the lifting member.

The included angle of taper of the wing body 1 of FIG. 1 is approximately 45°. However, this can be varied. The air discharged tangentially from the rotor thus follows a direction approximately 45° to the vertical, giving substantial lift and thrust components.

Various alternative forms of the lifting member 1 are shown in FIGS. 6 to 12 as follows:

In these various drawings the direction of the airflow relative to the lifting wing is from right to left whereas in FIGS. 1 and 2 it was from left to right. In each view the direction of rotation of the crossflow rotor is illustrated by a single headed arrow and in FIG. 6 a vortex airflow within the rotor is illustrated by doubled headed arrows, with the centre of the vortex being designated v, but in practice the position of the vortex will be located by experiment if the position of the centre needs to be known.

It is known that the efficiency of the crossflow rotor increases with the establishment of a vortex within and eccentric to the path of the rotor vanes, and rotating at an angular velocity much higher than that of the rotor and in the same direction of rotation. The establishment of such a vortex is enhanced by various means shown in FIGS. 6 to 12.

Figure 6:
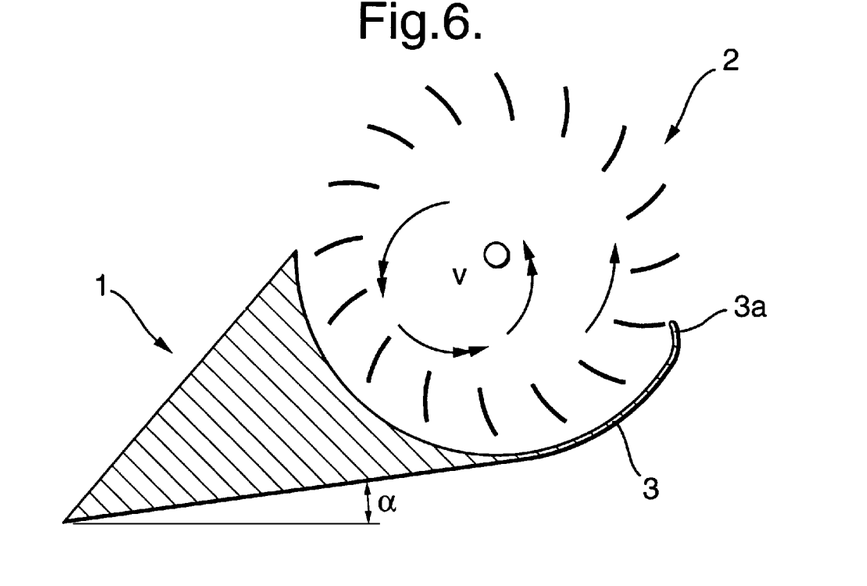
FIG. 6 is a sectional view of third embodiment of the lifting member according to the invention, shown from the opposite side from that in FIGS. 1 and 2.

In FIG. 6 the shroud 3 has its front end turned inward at 3a, and the result of this is the formation of a vortex centred within the rotor and having the direction of rotation indicated by the double headed arrows. FIG. 6 also illustrates the angle of incidence a of the wing body 1 measured in terms of the inclination of the underside of the wing body.

Figure 7:
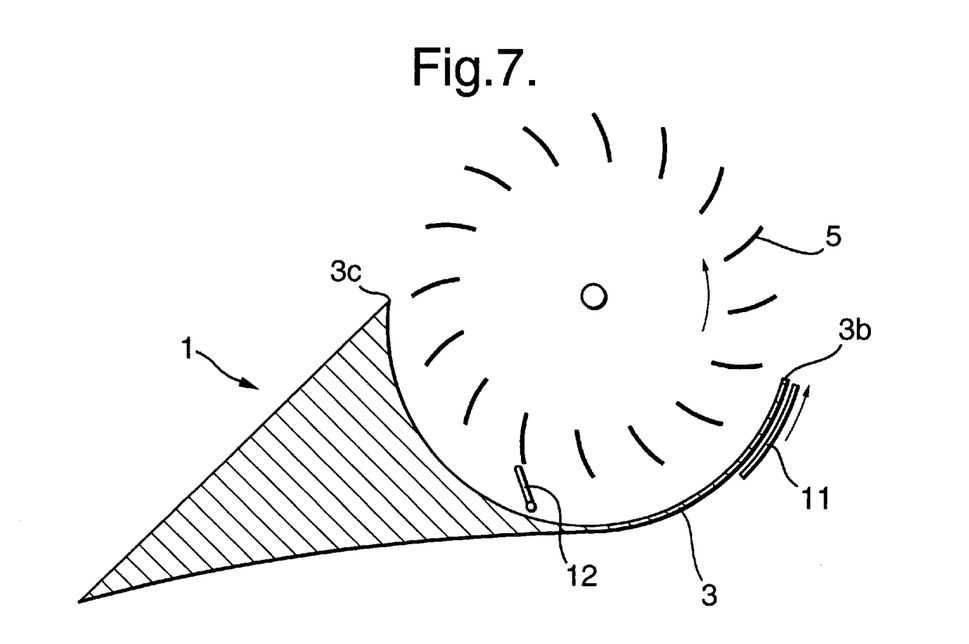
FIG. 7 is a view similar to FIG. 6 but showing a fourth embodiment of the lifting member incorporating two alternative forms of flow control (shown on the one drawing for the sake of simplicity)

FIG. 7 shows a departure from FIG. 6 in that the underside of the wing body 1 is concave to impart a degree of camber to the wing body, but furthermore the wing body of FIG. 7 has additional control features. At the front end of the shroud 3 is a movable baffle 11 which can be retracted to the position shown in FIG. 7 to allow maximum airflow into the rotor or can be extended upwardly and rightwardly so as to mask the inlet of the rotor to some extent, and thus to control the efficiency of that particular lifting body.

Also shown in FIG. 7 is a movable spoiler 12 which is illustrated in FIG. 7 as being extended so as to attenuate or to destroy the vortex. This again provides a measure of control of the efficiency of the lifting body.

It is envisaged that the baffle 11 and the spoiler 12 would be able to be used independently of one another, or together in the same embodiment, and for the sake of simplicity they have been shown in FIG. 7 as both being present. In FIG. 7 the shroud 3 is no longer concentric with the rotor 2 but has its end points 3b and 3c closer to the path of the vanes 5 of the rotor than is the shroud at a point between them (for example where the spoiler 12 is mounted), and this helps to generate the vortex provided either there is no spoiler 12 present or that spoiler has been moved anticlockwise from the FIG. 7 position to lie flush with the shroud 3.

FIG. 8 again has the shroud 3 non-concentric between the points 3b and 3c, in order to establish the vortex, but in this case there is a forward extension 3d of the shroud from the point 3b and substantially concentric with the rotor vane path.

Figure 8:
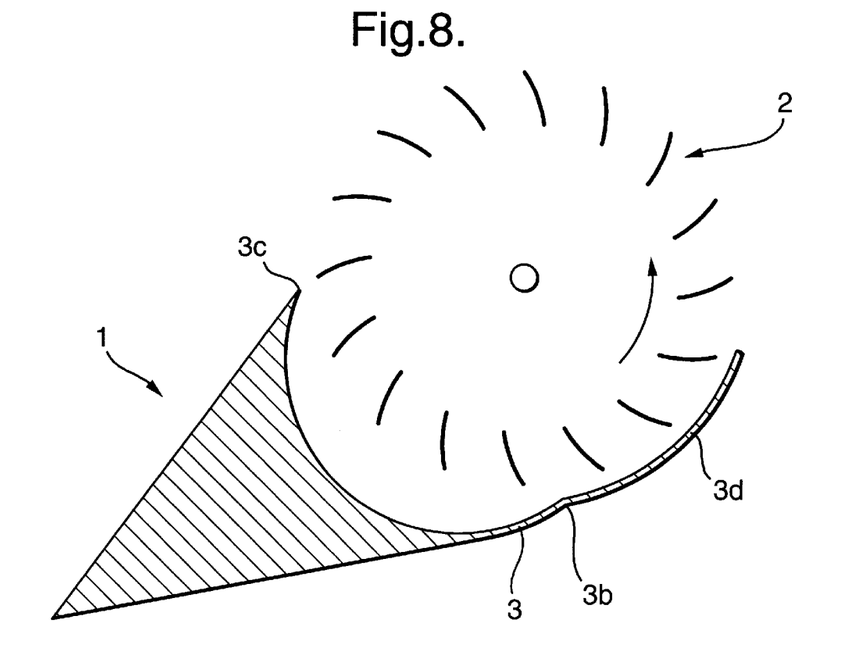
FIG. 8 is a view similar to FIG. 6 but of a fifth embodiment of the lifting member.
Figure 9:
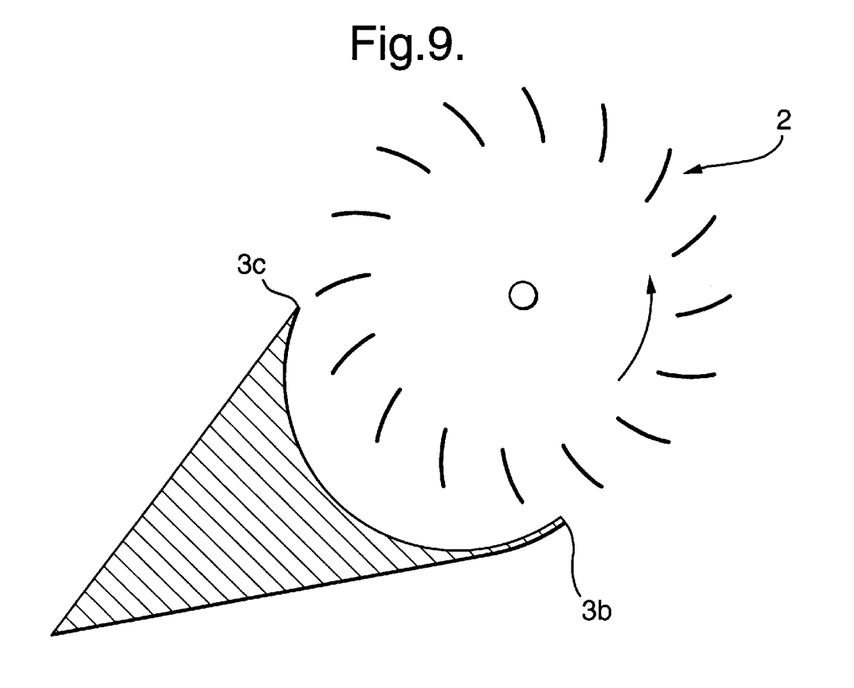
FIG. 9 is a view similar to FIG. 6 but showing a sixth embodiment of lifting member with a more open front to the leading edge crossflow rotor.

On the other hand, FIG. 9 lacks this forward extension 3d and provides a more open construction which, for a given speed of rotation of the crossflow rotor 2, is able to admit and discharge a greater volume flow rate of air than with the FIG. 8 embodiment.

Figure 10:
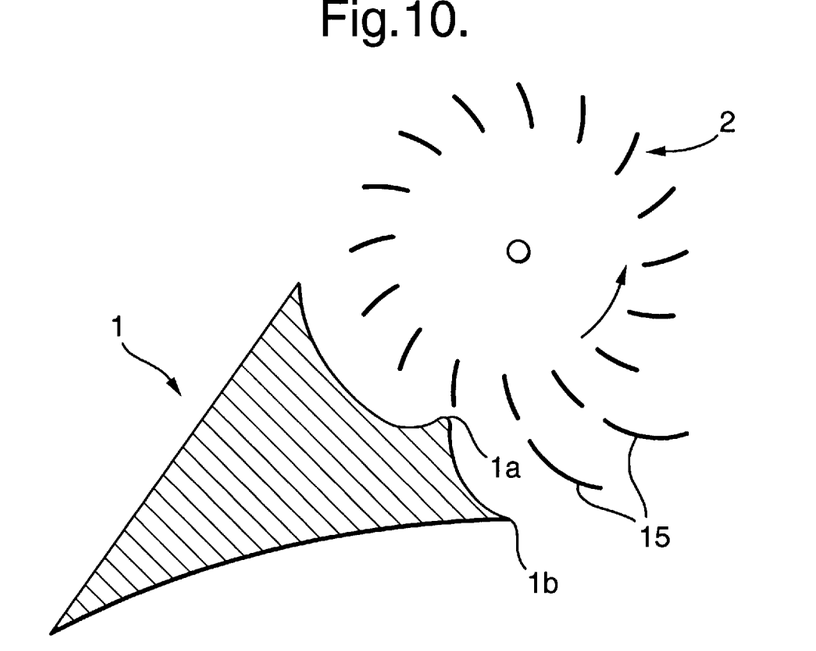
FIG. 10 is a view similar to FIG. 6 but showing a seventh embodiment of the lining member with inlet guide vanes to assist flow into the crossflow rotor.
Figure 11:
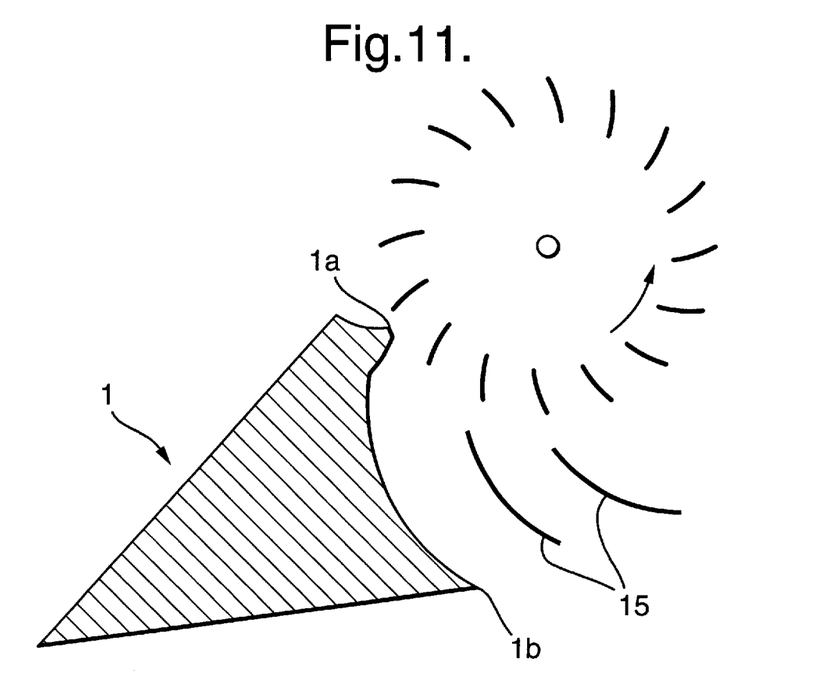
FIG. 11 is a view similar to FIG. 6 but of an eighth embodiment of lifting member according to the invention.

FIG. 10 provides for a larger air inlet area and relies on a bulge 1a of the lifting body 1 to define the necessary non-concentric portion, even though in this case there is no shroud as such. The formation of the vortex results from the cut away configuration of the part of the lifting body 1 facing the crossflow rotor 2. Towards the lower leading part 1b of the lifting body 1 is a concave section which, together with guide vanes 15, defines an inlet path or nozzle to guide incident air into the rotor blade path and hence to establish better the vortex and the flow through the crossflow rotor.

FIG. 11 again uses a bulge 1a, but this time positioned much higher on the lifting body 1 so that the air inlet "nozzles" defined by the convex surface of the lifting body 1 between bulge 1a and front 1b; also the two guide vanes 15 are much longer than in the FIG. 10 embodiment. This appears to give the most open configuration of the rotor, allowing the best possible flow conditions through the rotor.

Figure 12A:
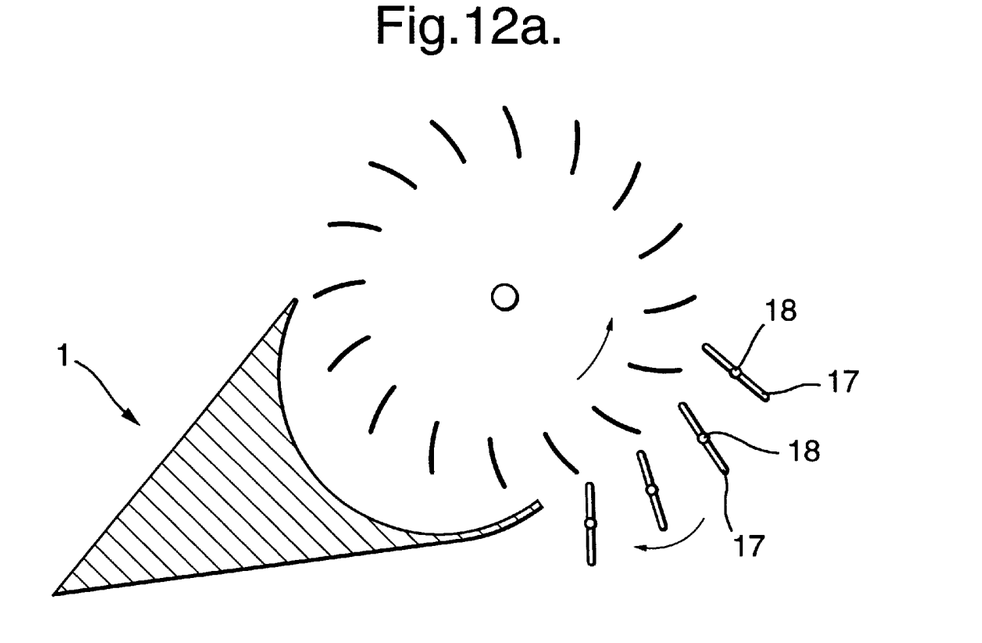
FIGS. 12a and 12b, respectively, show a ninth embodiment of the lifting member of the present invention, with inlet guide means open in FIG. 12a but closed in FIG. 12b.
Figure 12B:
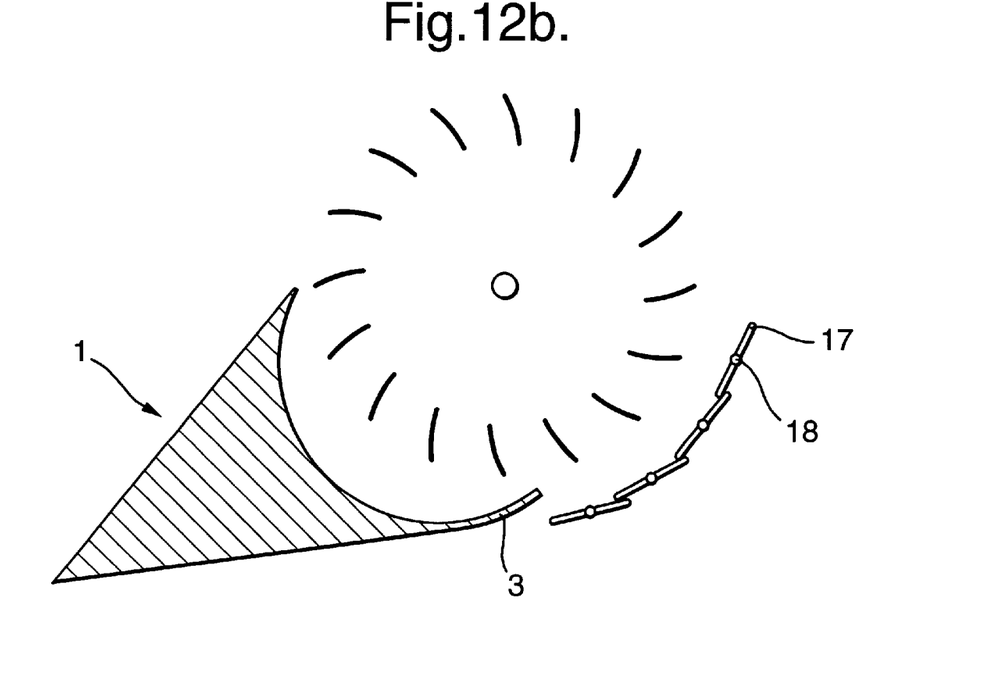

FIGS. 12a and 12b illustrate an alternative form of the lifting body 1 in which the inlet configuration can be altered in flight to control the efficiency of the lifting body. FIG. 12a shows a set of four straight inlet guide vanes 17, pivotable about their respective shafts 18, between the open position shown in FIG. 12a and a closed position shown in FIG. 12b. The lifting body 1 does have a vestige of the shroud 3, and it is possible to liken the inlet guide vanes 17 in their FIG. 12a position to the inlet guide vanes 15 of FIGS. 10 and 11, and in their closed (12b) position to the shroud extension 3d of FIG. 8 or the shrouds 3 of FIGS. 6 and 7.

Although only FIGS. 7 and 10 illustrate camber of the lifting wing body by means of a concave underside, it would of course be appreciated that any of the embodiments shown may have such a concave underside and/or a convex upper surface (6 in FIG. 1) to impart camber to the body.

Although the above description is based on a lifting member for an aircraft, there are various other possibilities. It may be that the device may have hydrodynamic applications, for example in propelling boats using such a member as an immersed keel or a hydrofoil wing.

In the aerodynamic field, the device may also be used for propelling and controlling boats using the aerodynamic effect rather than the hydrodynamic thrust of an immersed screw.

When used as the lifting wing for an aircraft, as mentioned above it is possible for other thrust means to be omitted and for the airflow generated by the rotor to provide all of both thrust and lift. With reference to the (model) aircraft depicted in FIG. 3, the drive motor for the rotors may operate such that pushing the control column to the left (port) will cause the rotor(s) of the starboard side lift-generating member to rotate faster than the rotor(s) on the port side, giving controllable roll and yaw to allow a balanced banked turn to be executed. There may still be a rudder to provide for the yaw, in which case this will be connected to the pilot's foot pedals. There may equally be some interconnection between the foot pedals and the speed differential mechanism, so that at high rotor powers there will be less rudder deflection needed for a given degree of yaw.

The elevator may be dispensed with but is more likely to be present and controlled by a trim lever rather than by rearward movement of the control column.

An aircraft incorporating such a lifting member will provide adequate degrees of lift at low speeds and will therefore have good STOL characteristics. The noise generated will be much lower than that of a conventional jet or propeller-driven machine. Because a large quantity of air is moving at a very low speed through the rotor the rotor blades themselves move slower than a conventional driving propeller so the blade noise can be much lower than that of a propeller.

In order to reduce noise levels still further it may be advantageous to shape the rotor vanes 5 so as to follow the path of a very coarse pitch helix about the axis of rotation of the shaft 4 so that they are nearly, but not quite, straight. This may avoid any tendency for a sudden noise to be created as each blade enters the trough at the trailing edge of the trough because whereas a straight blade parallel to that trough trailing edge will pass the trough edge at a single instant, a slightly helical blade will not but will instead have a point of approach which travels along the span of the wing body 1 (rather like the shearing action of the rotary blades of a cylinder mower passing a stationary straight blade).

An aeroplane incorporating such a lifting member will, for example, be applicable to sport and tourism in that an open-cockpit aircraft can be constructed to fly slowly and quietly using such a system. Equally, it can be useful for carrying loads over short distances (in view of its low flying speed). Furthermore, it can be useful for crop-dusting.

For passenger transport it may be particularly convenient to use this as a shuttle craft between nearby airports.

In the event of engine failure the spanwise rotors may be driven in autorotation by the airflow, so that recovery from a loss of lift would require simply an increase in forward speed, in a dive, and then, on nearing the ground, flattening out the flight path to exploit the kinetic energy of the rotor somewhat like the case of engine-off autorotation of a helicopter.

I claim:

1. A lift-generating member comprising a wing defining a front end and a trailing edge, opposed first and second wing surfaces which converge towards said trailing edge, and a spanwise extending tangential-flow rotor having vanes and positioned adjacent the front end and said first wing surface to define an air intake region and an air discharge region along the circumferential path of the rotor vanes; wherein the rotor rotates in a direction which carries the rotor vanes in the part of their path which is adjacent said first wing surface in a direction which extends towards the trailing edge of the wing; characterised in that the rotor projects radially proud of the said first wing surface over at least said air discharge region; and in that the rotor is exposed to air at the front end of the wing to define a leading end of the lift-generating member and to take in air at the front end of said wing and to discharge it over said first wing surface as a result of rotation of the rotor.

2. A lift-generating member comprising a wing defining a front end and a trailing edge, opposed first and second wing surfaces which converge towards said trailing edge, and a spanwise extending tangential-flow rotor having vanes and positioned adjacent the front end and said first wing surface to define an air intake region and an air discharge region along the circumferential path of the rotor vanes; wherein the rotor rotates in a direction which carries the rotor vanes in the part of their path which is adjacent said first wing surface in a direction which extends towards the trailing edge of the wing; characterised in that the wing defines a trough extending spanwise of the wing; in that said trough has parallel leading and trailing edges of which the leading edge of the trough defines said front end of the wing and the trailing edge of the trough is flush with said first wing surface; in that the rotor is positioned in said trough; in that the rotor projects radially proud of the said first wing surface over at least said air discharge region; and in that the rotor is exposed to air at the front end of the wing to define a leading end of the lift-generating member and to take in air at the front end of said wing and to discharge it over said first wing surface as a result of rotation of the rotor.

3. A lift-generating member according to claim 2, wherein said rotor includes a plurality of discs extending perpendicular to the span of said wing, said rotor vanes being mounted between the discs to extend in a direction parallel to the axis of rotation of said rotor body between adjacent said discs, and being secured to the discs with an angle of inclination relative to the radius of the disc to which the vane is attached.

4. A lift-generating member according to claim 2, wherein said wing has an effective camber between its front end and its trailing edge by virtue of the geometry of the part of the wing located behind the rotor.

5. A lift-generating member according to claim 2, wherein each said rotor vane extends along a helix centered on the axis of rotation of the rotor.

6. A lift-generating member according to claim 2, wherein the front end of the wing includes a shroud around a part of the circumference of the rotor and having one part which is closer to the rotor circumference than is the remainder of the shroud.

7. An aircraft incorporating port and starboard lift-generating members in accordance with claim 2, and drive means for driving the spanwise rotors of said lift generating members, and including means to vary the distribution of power between the port and starboard lift generating member rotors.

8. An aircraft according to claim 7, wherein said power distribution varying means are controlled by a pilot's control column of the aircraft whereby displacement of the control column to port generates a condition in which the power distribution to the rotors provides for a higher speed of the starboard rotor as compared with that of the port rotor.

9. An aircraft according to claim 7, wherein said rotors provide the sole means of generating propulsive thrust for the aircraft.

* * * * *